(12) United States Patent
Praszczalek

(10) Patent No.: US 12,199,978 B2
(45) Date of Patent: Jan. 14, 2025

(54) SYSTEMS, METHODS, AND NON-TRANSITORY COMPUTER-READABLE MEDIA FOR BIOMETRICALLY CONFIRMING TRUSTED ENGAGEMENT

(71) Applicant: MASTERCARD INTERNATIONAL INCORPORATED, Purchase, NY (US)

(72) Inventor: Przemek Praszczalek, Irvington, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 251 days.

(21) Appl. No.: 17/866,415

(22) Filed: Jul. 15, 2022

(65) Prior Publication Data

US 2024/0022562 A1 Jan. 18, 2024

(51) Int. Cl.
*H04L 29/00* (2006.01)
*H04L 9/40* (2022.01)

(52) U.S. Cl.
CPC ........ *H04L 63/0861* (2013.01); *H04L 63/083* (2013.01)

(58) Field of Classification Search
CPC .......................... H04L 63/0861; H04L 63/083
See application file for complete search history.

(56) References Cited

U.S. PATENT DOCUMENTS

| | | | |
|---|---|---|---|
| 9,619,965 B1 * | 4/2017 | Hill | G07F 17/3227 |
| 10,129,229 B1 | 11/2018 | Leavy et al. | |
| 10,193,884 B1 * | 1/2019 | Griffin | G06F 21/33 |
| 10,255,419 B1 * | 4/2019 | Kragh | H04L 9/321 |
| 10,552,637 B1 * | 2/2020 | Phillips | G06Q 40/06 |
| 10,911,425 B1 * | 2/2021 | Hitchcock | G06F 21/34 |
| 10,956,986 B1 * | 3/2021 | Ran | G06F 16/24573 |
| 11,128,636 B1 * | 9/2021 | Jorasch | H04W 12/33 |
| 11,227,036 B1 * | 1/2022 | Hitchcock | G06F 21/40 |
| 11,233,788 B1 * | 1/2022 | Hitchcock | G06F 21/32 |

(Continued)

OTHER PUBLICATIONS

International Search Report and Written Opinion for Application No. PCT/US2023/023362 dated Sep. 14, 2023 (8 pages).

*Primary Examiner* — Don G Zhao
(74) *Attorney, Agent, or Firm* — Michael Best & Friedrich LLP

(57) ABSTRACT

Systems, methods, and non-transitory computer-readable media for biometrically confirming a trusted engagement between two or more individuals that overcomes an identity challenge from a digital environment. The identity challenge including but not limited to: when two or more individuals met in the digital environment only to meet in person, when two or more parties to a contract want to ensure that the true parties sign an agreement, when one or more individuals wants to provide proof of past interactions, when an individual or an entity wants to minimize a risk of a party to a financial transaction is using stolen identity credentials, when an individual receives a friend request from an unknown individual, when an individual wants to ban interactions with an undesired personal contact, when an individual meets with an imposter during a person-to-person transaction, and when an individual meets a friend that has created a new digital persona.

20 Claims, 11 Drawing Sheets

(56) References Cited

U.S. PATENT DOCUMENTS

| | | | | |
|---|---|---|---|---|
| 2003/0004881 | A1* | 1/2003 | Shinzaki | H04L 63/083 705/51 |
| 2007/0245152 | A1* | 10/2007 | Pizano | H04L 63/0861 713/186 |
| 2009/0117883 | A1* | 5/2009 | Coffing | H04L 51/58 455/414.1 |
| 2012/0116963 | A1* | 5/2012 | Klein | G06Q 20/102 705/40 |
| 2012/0116973 | A1* | 5/2012 | Klein | G06Q 20/3223 705/44 |
| 2013/0018791 | A1* | 1/2013 | Mendicino | G06Q 20/4016 705/44 |
| 2014/0310171 | A1* | 10/2014 | Grossman | G06Q 20/384 705/44 |
| 2014/0310172 | A1* | 10/2014 | Grossman | G06Q 20/10 705/44 |
| 2015/0033305 | A1* | 1/2015 | Shear | G06F 21/53 726/11 |
| 2016/0012465 | A1* | 1/2016 | Sharp | G06Q 20/321 705/14.17 |
| 2016/0063336 | A1 | 3/2016 | Poplavski et al. | |
| 2016/0065558 | A1* | 3/2016 | Suresh | G06F 21/32 726/7 |
| 2016/0072800 | A1* | 3/2016 | Soon-Shiong | G16B 50/00 726/7 |
| 2017/0011213 | A1* | 1/2017 | Cavanagh | H04L 67/02 |
| 2017/0011214 | A1* | 1/2017 | Cavanagh | H04L 63/0846 |
| 2017/0041296 | A1* | 2/2017 | Ford | G06F 21/64 |
| 2017/0116603 | A1* | 4/2017 | Bogaard | G06Q 20/02 |
| 2017/0195274 | A1* | 7/2017 | Liberty | H04L 51/42 |
| 2017/0351729 | A1* | 12/2017 | Sarbaev | G06Q 20/00 |
| 2018/0329999 | A1* | 11/2018 | Kale | G06F 16/2455 |
| 2019/0141033 | A1 | 5/2019 | Kaafar et al. | |
| 2019/0149334 | A1* | 5/2019 | Van Der Velden | H04L 9/0877 713/185 |
| 2019/0186077 | A1* | 6/2019 | Cornick | D21H 17/66 |
| 2019/0220583 | A1* | 7/2019 | Douglas | G06F 21/316 |
| 2019/0253415 | A1* | 8/2019 | Pitters | H04L 63/0861 |
| 2019/0272539 | A1* | 9/2019 | Bogaard | G06Q 20/322 |
| 2019/0273607 | A1* | 9/2019 | Van Der Velden | H04L 9/088 |
| 2019/0347426 | A1* | 11/2019 | Coffing | H04L 51/58 |
| 2020/0074056 | A1* | 3/2020 | Hruska | H04W 12/06 |
| 2020/0396079 | A1 | 12/2020 | Dekant et al. | |
| 2021/0051142 | A1* | 2/2021 | Cu Castro | G06F 9/452 |
| 2021/0058395 | A1* | 2/2021 | Jakobsson | H04L 67/306 |
| 2021/0224811 | A1* | 7/2021 | Eisen | G06Q 20/4016 |
| 2021/0226933 | A1 | 7/2021 | Puzeris et al. | |
| 2022/0019649 | A1* | 1/2022 | Boyd | H04L 9/0825 |
| 2023/0075978 | A1* | 3/2023 | Coffing | G06F 21/60 |
| 2023/0206329 | A1* | 6/2023 | Cella | G06F 16/906 |
| 2023/0214925 | A1* | 7/2023 | Cella | G06Q 30/06 705/37 |
| 2023/0274277 | A1* | 8/2023 | Kurani | G06Q 20/18 705/39 |
| 2023/0291731 | A1* | 9/2023 | O'Neill | H04L 63/0853 |
| 2023/0376581 | A1* | 11/2023 | Shear | H04L 63/0861 |
| 2024/0022562 | A1* | 1/2024 | Praszczalek | H04L 63/083 |

* cited by examiner

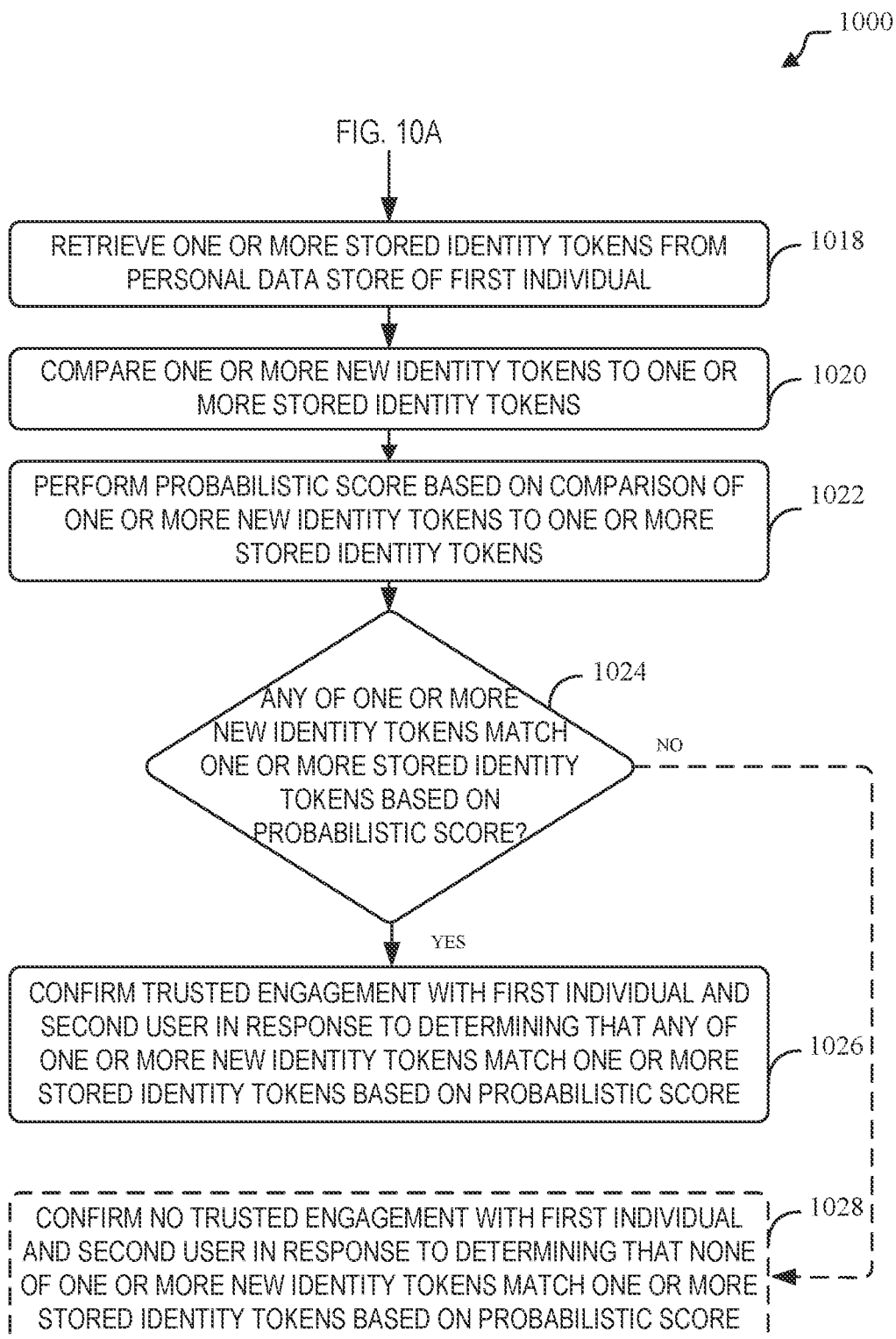

SYSTEMS, METHODS, AND NON-TRANSITORY COMPUTER-READABLE MEDIA FOR BIOMETRICALLY CONFIRMING TRUSTED ENGAGEMENT

FIELD OF THE INVENTION

The present disclosure relates generally to secure data interactions. More specifically, the present disclosure relates to systems, methods, and non-transitory computer-readable media for biometrically confirming trusted engagements in a digital environment.

BACKGROUND

Whenever two or more individuals meet online or in the digital space, the individuals have little means to prove that they have established a trusted relationship, especially in a digital environment, where individuals may be represented by their digital profiles, avatars, decentralized identity owners, or other digital representations.

SUMMARY

To solve the inability to prove a trusted relationship, in one instance, two users with the same type of unique identifiers may leverage their unique relationship to create biometrically-derived identity tokens, which are exchanged with one another and subsequently used to re-affirm their trusted relationship whenever they meet again (either in person or in the digital world). This re-affirming of their trusted relationship is called "biometrically confirming a trusted engagement."

Additionally, to solve the inability to prove a trusted relationship, in a second instance, two users with different types of unique identifiers (or unknown identifiers) may create biometrically-derived identity tokens for their respective counterpart (interlocutor) using a set key or sub-set of keys for the user who will store tokens of his/her engagement counterpart, and add identity tokens to a secure vault of identity tokens for future interactions. Whenever the two users meet again, if one of them is able/willing to provide the same biometric modality (e.g. face, palm, etc.), the other user may leverage an identity engine to create a comparable identity token using his/her key (without any input from the other user except for biometrics). The comparable identity token may then be used to conduct a search to see whether that user has interacted with the other user in the past to confirm the trusted engagement.

Another benefit of the present disclosure is that the confirmation of the trusted engagement does not require a photo of the individual be shared with any other individual. Therefore, the biometric confirmation of the trusted engagement is privacy enhancing because the individuals may never know what each other look like while still being able to confirm that they have met each other in a digital environment.

One embodiment described herein is a system for biometrically confirming a trusted engagement between two or more individuals. The system includes a first user device including a first electronic processor and a first memory, the first user device associated with a first individual, a second user device including a second electronic processor and a second memory, the second user device associated with a second individual, and a server including a third electronic processor and a third memory. The third electronic processor configured to receive a request from the first individual to confirm a trusted engagement with a second user, request a unique identifier from the first individual, confirm the first individual owns the unique identifier, determine a unique key associated with the first individual in response to confirming the first individual owns the unique identifier, request consent from the second user to perform a biometric capture on biometrics of the second user, receive the biometrics of the second user, tokenize a biometric template based on the biometrics of the second user with the unique key associated with the first individual, generate one or more new identity tokens from the tokenization of the biometric template of the second user, retrieve one or more stored identity tokens from a personal data store of the first individual, compare the one or more new identity tokens to the one or more stored identity tokens, perform a probabilistic score based on the comparison of the one or more new identity tokens to the one or more stored identity tokens, determine whether any of the one or more new identity tokens match the one or more stored identity tokens based on the probabilistic score, and confirm the trusted engagement with the first individual and the second user in response to determining that the any of the one or more new identity tokens match the one or more stored identity tokens based on the probabilistic score.

Another embodiment described herein is a method. The method includes receiving, with a server, a request from a first user to confirm a trusted engagement with a second user. The method includes requesting, with the server, a unique identifier from the first individual. The method includes confirming, with the server, the first individual owns the unique identifier. The method includes determining, with the server, a unique key associated with the first individual in response to confirming the first individual owns the unique identifier. The method includes requesting, with the server, consent from the second user to perform a biometric capture on biometrics of the second user. The method includes receiving, with the server, the biometrics of the second user. The method includes tokenizing, with the server, a biometric template based on the biometrics of the second user with the unique key associated with the first individual. The method includes generating, with the server, one or more new identity tokens from the tokenization of the biometric template of the second user. The method includes retrieving, with the server, one or more stored identity tokens from a personal data store of the first individual. The method includes comparing, with the server, the one or more new identity tokens to the one or more stored identity tokens. The method includes performing, with the server, a probabilistic score based on the comparison of the one or more new identity tokens to the one or more stored identity tokens. The method includes determining, with the server, whether any of the one or more new identity tokens match the one or more stored identity tokens based on the probabilistic score. The method also includes confirming, with the server, the trusted engagement with the first individual and the second user in response to determining that the any of the one or more new identity tokens match the one or more stored identity tokens based on the probabilistic score.

Yet another embodiment described herein is a non-transitory computer-readable medium comprising instructions that, when executed by an electronic processor, cause the electronic processor to perform a set of operations. The set of operations includes receiving a request from a first user to confirm a trusted engagement with a second user. The set of operations includes requesting a unique identifier from the first individual. The set of operations includes confirming the first individual owns the unique identifier. The set of operations includes determining a unique key associated with the first individual in response to confirming the first individual owns the unique identifier. The set of operations includes requesting consent from the second user to perform a biometric capture on biometrics of the second user. The set of operations includes receiving biometrics of the second user. The set of operations includes tokenizing a biometric template based on the biometrics of the second user with the unique key associated with the first individual. The set of operations includes generating one or more new identity tokens from the tokenization of the biometric template of the second user. The set of operations includes retrieving one or more stored identity tokens from a personal data store of the first individual. The set of operations includes comparing the one or more new identity tokens to the one or more stored identity tokens. The set of operations includes performing a probabilistic score based on the comparison of the one or more new identity tokens to the one or more stored identity tokens. The set of operations includes determining whether any of the one or more new identity tokens match the one or more stored identity tokens based on the probabilistic score. The set of operations also includes confirming the trusted engagement with the first individual and the second user in response to determining that the any of the one or more new identity tokens match the one or more stored identity tokens based on the probabilistic score.

Other aspects of the embodiments will become apparent by consideration of the detailed description and accompanying drawings.

BRIEF DESCRIPTION OF THE DRAWINGS

FIGS. 10A and 10B are flow diagrams illustrating an example process for biometrically confirming a trusted engagement between two or more individuals, in accordance with various aspects of the present disclosure.

DETAILED DESCRIPTION OF THE EMBODIMENTS

Figure 1:
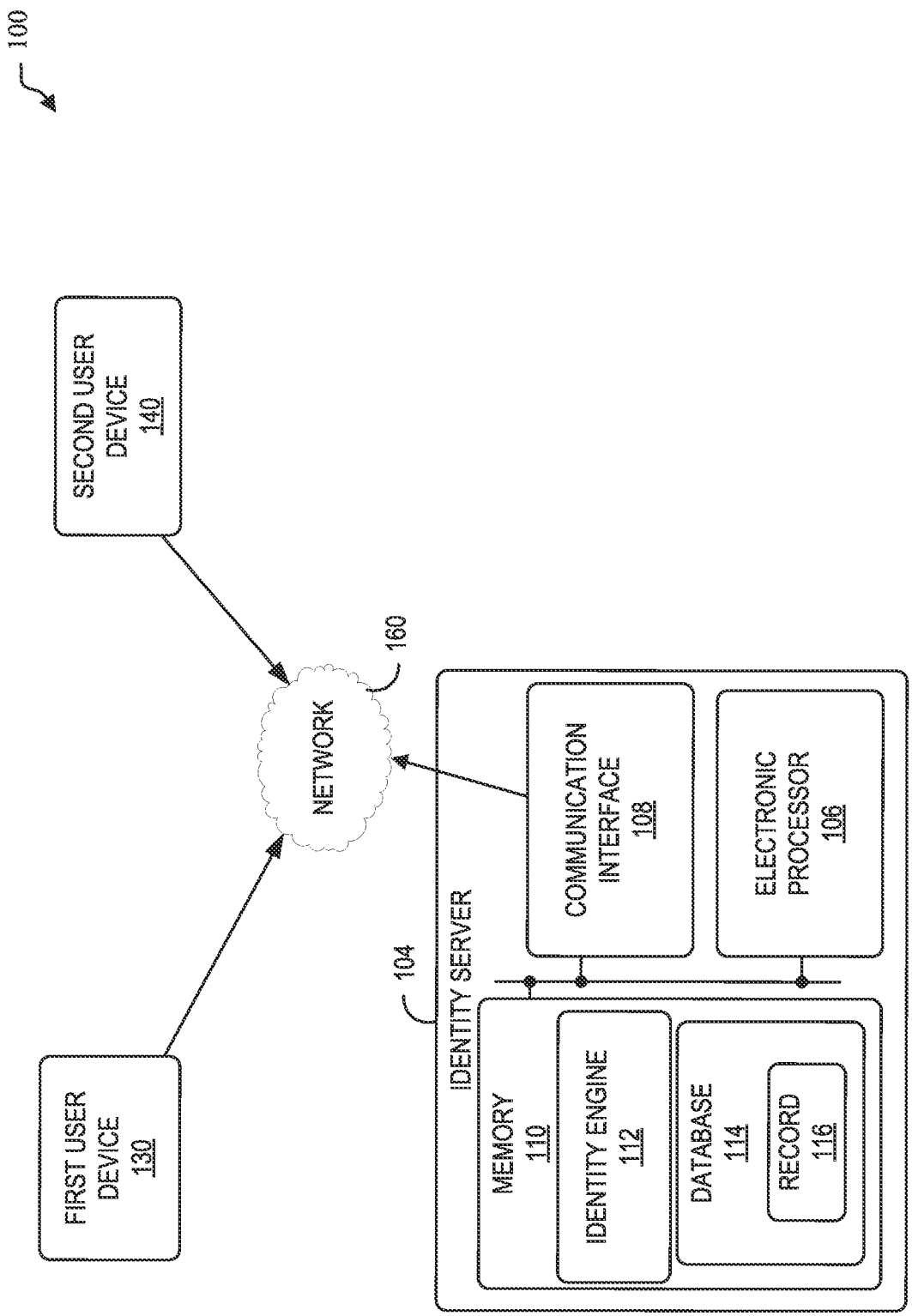
FIG. 1 is a block diagram illustrating an example system for establishing and confirming a trusted engagement between two or more individuals, in accordance with various aspects of the present disclosure.

FIG. 1 is a block diagram illustrating an example system 100 for establishing and confirming a trusted engagement between two or more individuals, in accordance with various aspects of the present disclosure. In the example of FIG. 1, the system 100 includes an identity server 104, a first user device 130, a second user device 140, and a network 160.

The identity server 104 may be owned by, or operated by or on behalf of, an administrator. The identity server 104 includes an electronic processor 106, a communication interface 108, and a memory 110. The electronic processor 106 is communicatively coupled to the communication interface 108 and the memory 110. The electronic processor 106 is a microprocessor or another suitable processing device. The communication interface 108 may be implemented as one or both of a wired network interface and a wireless network interface. The memory 110 is one or more of volatile memory (e.g., RAM) and non-volatile memory (e.g., ROM, FLASH, magnetic media, optical media, et cetera). In some examples, the memory 110 is also a non-transitory computer-readable medium. Although shown within the identity server 104, memory 110 may be, at least in part, implemented as network storage that is external to the identity server 104 and accessed via the communication interface 108. For example, all or part of memory 110 may be housed on the "cloud."

The identity engine 112 may be stored within a transitory or non-transitory portion of the memory 110. The identity engine 112 includes machine readable instructions that are executed by the electronic processor 106 to perform the functionality of the identity server 104 as described below with respect to FIGS. 3-5 and 7-10B.

The memory 110 may include a database 114 for storing information about individuals. The database 114 may be an RDF database, i.e., employ the Resource Description Framework. Alternatively, the database 114 may be another suitable database with features similar to the features of the Resource Description Framework, and various non-SQL databases, knowledge graphs, etc. The database 114 may include a plurality of records (also referred to herein as a "data pod" or "data store"). Each record may be associated with and contain personal information about one individual. For example, in the illustrated embodiment, record 116 may be associated with the individual associated with the first user device 130, and other N records may be respectively associated with one of N other individuals (not expressly shown in FIG. 1).

The first user device 130 may be web-compatible mobile computer, such as a laptop, a tablet, a smart phone, or other suitable computing device. Alternately, or in addition, the first user device 130 may be a desktop computer. The first user device 130 includes an electronic processor in communication with memory. In an embodiment, the electronic processor of the first user device 130 is also in communication with a biometric scanner via a communication interface. In another embodiment, the biometric scanner may be part of the first user device 130. The electronic processor is a microprocessor or another suitable processing device, the memory is one or more of volatile memory and non-volatile memory, and the biometric scanner is one or more biometric scanning devices (e.g., a device that scans fingerprints, facial features, irises, handwriting, etc.) now known or subsequently developed. The communication interface may be a wireless or wired network interface.

An application, which contains software instructions implemented by the electronic processor of the first user device 130 to perform the functions of the first user device 130 as described herein, is stored within a transitory or a non-transitory portion of the memory. The application may have a graphical user interface that facilitates interaction between a first individual and the first user device 130.

The first user device 130 may communicate with the identity server 104 over the network 160. The network 160 is preferably (but not necessarily) a wireless network, such as a wireless personal area network, local area network, or other suitable network. In some examples, the second user device 140 may directly communicate with the identity server 104. In other examples, the second user device 140 may indirectly communicate over network 160.

In an embodiment, the memory of the first user device 130 may include a database and software. The database of the first user device 130 may include information about an individual associated with the second user device 140 and other individuals, as set forth herein. The software of the first user device 130 may facilitate interaction between the first user device 130 and individuals associated with other devices (e.g., the individual associated with the second user device 140) and allow for the first user device 130 to perform the operations as described in greater detail below.

The second user device 140 may be web-compatible mobile computer, such as a laptop, a tablet, a smart phone, or other suitable computing device. Alternately, or in addition, the second user device 140 may be a desktop computer. The second user device 140 includes an electronic processor in communication with memory. In an embodiment, the electronic processor of the second user device 140 is also in communication with a biometric scanner via a communication interface. In another embodiment, the biometric scanner may be part of the second user device 140. The electronic processor is a microprocessor or another suitable processing device, the memory is one or more of volatile memory and non-volatile memory, and the biometric scanner is one or more biometric scanning devices (e.g., a device that scans fingerprints, facial features, irises, handwriting, etc.) now known or subsequently developed. The communication interface may be a wireless or wired network interface.

An application, which contains software instructions implemented by the electronic processor of the second user device 140 to perform the functions of the second user device 140 as described herein, is stored within a transitory or a non-transitory portion of the memory. The application may have a graphical user interface that facilitates interaction between a second individual and the second user device 140, the second individual being different from the first individual.

The second user device 140 may communicate with the identity server 104 over the network 160. The network 160 is preferably (but not necessarily) a wireless network, such as a wireless personal area network, local area network, or other suitable network. In some examples, the second user device 140 may directly communicate with the identity server 104. In other examples, the second user device 140 may indirectly communicate over network 160.

In an embodiment, the memory of the second user device 140 may include a database and software. The database of the second user device 140 may include information about an individual associated with the first user device 130 and other individuals, as set forth herein. The software of the second user device 140 may facilitate interaction between the second user device 140 and individuals associated with other devices (e.g., the individual associated with the first user device 130) and allow for the second user device 140 to perform the operations as described in greater detail below.

The identity server 104 may likewise communicate with partner devices other than the first user device 130 and the second user device 140. The term "individual", as used herein, encompasses a person (or other entity) that seeks to interact with another individual (e.g., another person, organization, or entity) or individuals (e.g., other persons, organizations, entities, or a combination thereof). The workings of the identity server 104, the first user device 130, and the second user device 140 will now be described in additional detail with respect to FIGS. 3-5 and 7-10B.

Figure 2:
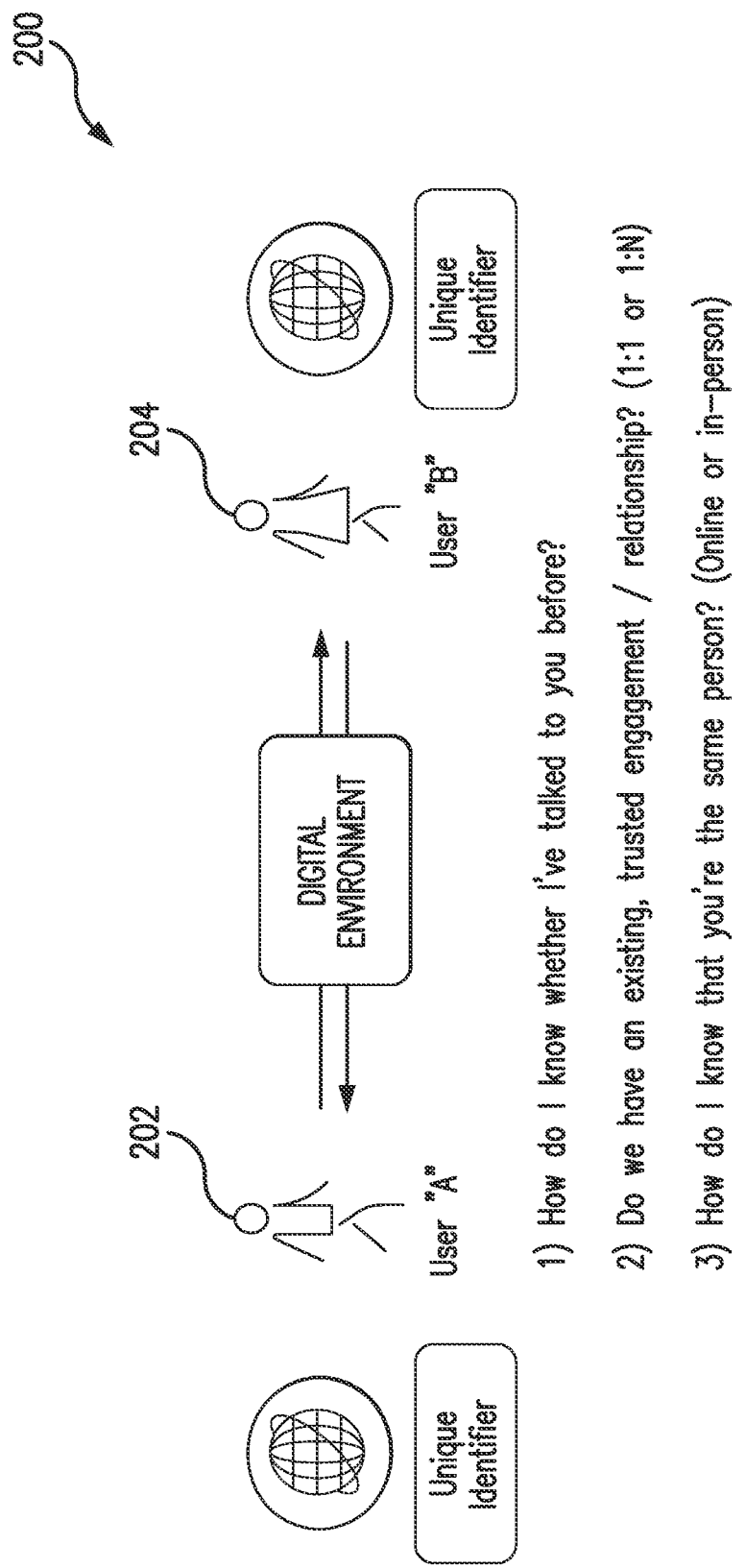
FIG. 2 is a diagram illustrating an example of an identity challenge.

FIG. 2 is a diagram illustrating an example of an identity challenge 200. In FIG. 2, a first user 202 (User "A") interacts with a second user 204 (User "B") in a digital environment. In the digital environment, several questions arise between the first user 202 (also referred to as "a first individual") and the second user 204 (also referred to as a "second individual"), which is referred to as the identity challenge 200. A first question may be "How do I know I have interacted with you before?" A second question may be "Do we have an existing, trusted engagement/relationship, either one to one (1:1) or one to many (1:N)?" A third question may be "How do I know that you are the same person (online or in-person)?" A fourth question may be "Should I "accept" or "reject" your request for interaction?"

The identity challenge 200 may occur in many different situations. In a first example, the identity challenge 200 may occur when two or more individuals met in the digital environment only to meet in person. In a second example, the identity challenge 200 may occur when two or more parties to a financial or legal contract and the two or more parties want to ensure that the true parties sign an agreement. In a third example, the identity challenge 200 may occur when one or more individuals wants to provide proof of past or existing interactions. In a fourth example, the identity challenge 200 may occur when an individual or entity wants to minimize a risk of a party to a financial transaction is using stolen identity credentials. Lastly, the identity challenge 200 is not limited to these four examples and other examples of the identity challenge 200 may also exist and are solved by the present disclosure.

Figure 3:
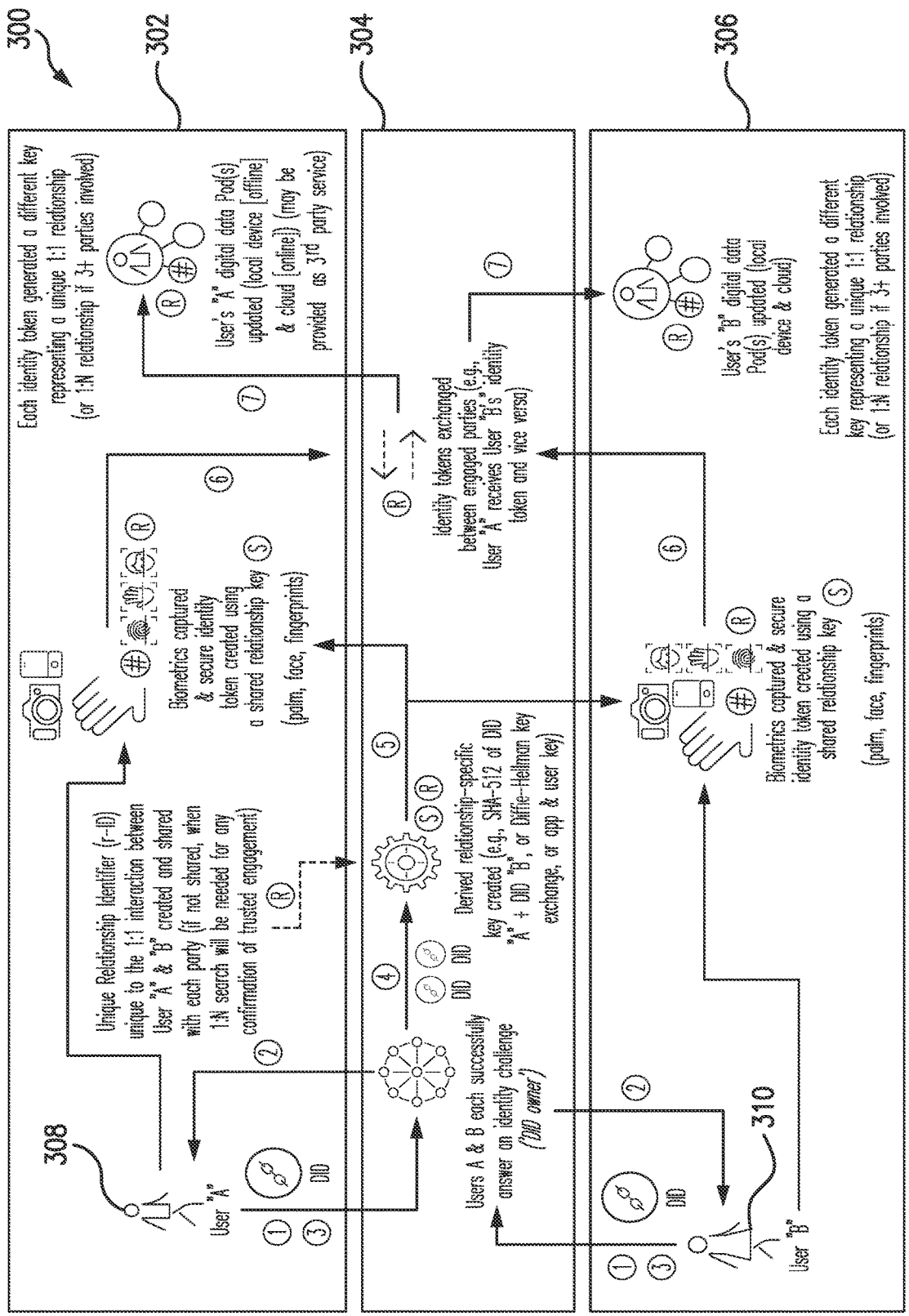
FIG. 3 is a flow diagram illustrating an example 300 of establishing a trusted engagement with a similar identifier type, in accordance with various aspects of the present disclosure.

FIG. 3 is a flow diagram illustrating an example 300 of establishing a trusted engagement with a similar identifier type, in accordance with various aspects of the present disclosure. The example 300 includes three different sections, the first user section 302, the server section 304, and the second user section 306, where the server section 304 is performed by an identity server, for example, the identity server 104 of FIG. 1.

To establish the trusted engagement, at operation 1, a first user 308 in the first user section 302 and a second user 310 (in parallel or subsequently) challenge each other via an identity server (e.g., the identity server 104) in the server section 304 with their respective decentralized identifiers ("DID"). At operation 2, the identity server responds with an identity challenge to the first user 308 and the second user 310. At operation 3, the first user 308 and the second user 310 respond to the identity challenge with an answer to the identity server.

At operation 4, the identity server confirms the respective answers from the first user 308 and the second user 310 are successful answers and derives a relationship-specific key from the respective DIDs of the first user 308 and the second user 310. In some examples, the relationship-specific key may be a SHA-512 of the DID of the first user 308 and the DID of the second user 310. In other examples, the relationship-specific key may be a Diffie-Hellman key exchange. In yet other examples, the relationship-specific key may be an app and user key.

At operation 5, the identity server sends the relationship-specific key to a first biometric device (e.g., a first user device with a camera and operated by the first user 308) and a second biometric device (e.g., a second user device with a camera and operated by the second user 310). At operation 6, the first biometric device and the second biometric device capture biometrics from the first user 308 and the second user 310, respectively, create respective identity tokens using the relationship-specific key that was sent in operation 5, and send their respective identity tokens to the identity server. The respective identity tokens are indicative of a unique 1:1 relationship or a 1:N relationship if three or more parties are involved. Additionally, in some examples, the biometrics captured by the biometric device may be palm biometrics, facial biometrics, fingerprint biometrics, or other suitable biometrics.

At operation 7, the identity server exchanges the identity tokens between the first user 308 and the second user 310. For example, when the first biometric device and the second biometric device are the first user device 130 and the second user device 140, respectively, then the identity server sends the identity token of the first user 308 to the second user device 140 and the identity token of the second user 310 to the first user device 130.

Additionally, in some examples, the identity server also updates a first data pod associated with the first user 308 to store both the relationship-specific token "R" and the identity token of the second user 310 and updates a second data pod associated with the second user 310 to store both the relationship-specific token "R" and the identity token of the first user 308. The first data pod and the second data pod may be located on a local device (e.g., the first user device 130 and the second user device 140) or on a cloud device (e.g., on the identity server 104 or other suitable third-party cloud device).

Figure 4:
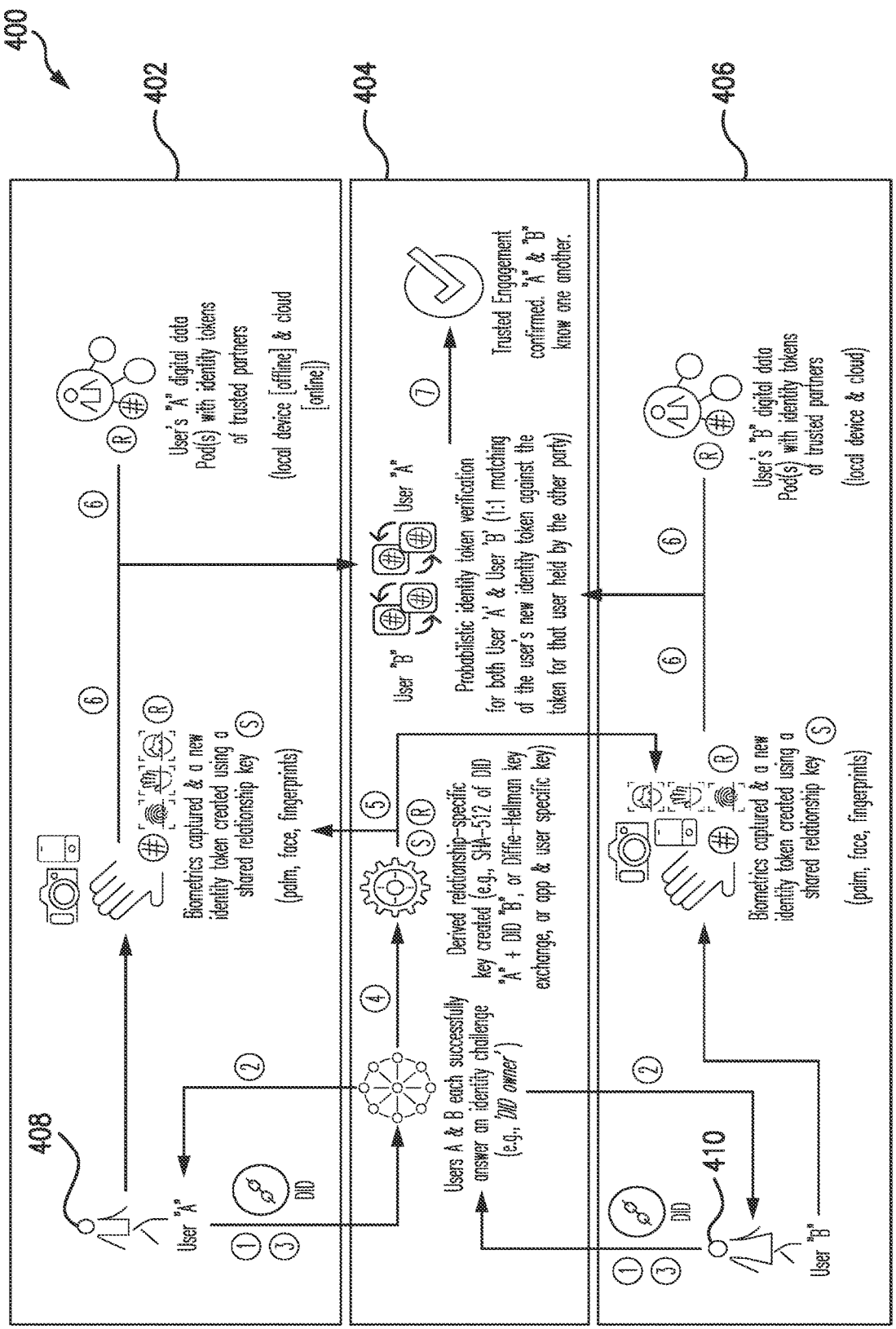
FIG. 4 is a flow diagram illustrating an example of confirming a trusted engagement with a similar identifier type, in accordance with various aspects of the present disclosure.

As illustrated in FIG. 3, the trusted engagement is first established by the exchange of identity tokens at operation 7. FIG. 4 is a flow diagram illustrating an example of confirming a trusted engagement 400 with a similar identifier type, in accordance with various aspects of the present disclosure. Like the example 300, the second example 400 also includes three different sections, the first user section 402, the server section 404, and the second user section 406, where the server section 404 is performed by an identity server, for example, the identity server 104 of FIG. 1.

To confirm the trusted engagement, at operation 1, a first user 408 in the first user section 402 and a second user 410 (in parallel or subsequently) challenge each other via an identity server (e.g., the identity server 104) in the server section 404 with their respective decentralized identifiers ("DID"). At operation 2, the identity server responds with an identity challenge to the first user 408 and the second user 410. At operation 3, the first user 408 and the second user 410 respond to the identity challenge with an answer to the identity server that proves ownership of their respective decentralized identifiers.

At operation 4, the identity server confirms the respective answers from the first user 408 and the second user 410 are successful answers and derives a relationship-specific key from the respective DIDs of the first user 408 and the second user 410. In some examples, the relationship-specific key may be a SHA-512 of the DID of the first user 408 and the DID of the second user 410. In other examples, the relationship-specific key may be a Diffie-Hellman key exchange. In yet other examples, the relationship-specific key may be an app and user key.

At operation 5, the identity server sends the relationship-specific key to a first biometric device (e.g., the first user device 130 with a camera and operated by the first user 408) and a second biometric device (e.g., the second user device 140 with a camera and operated by the second user 410). At operation 6, the first biometric device and the second biometric device capture biometrics from the first user 408 and the second user 410, respectively, create respective identity tokens using the relationship-specific key that was sent in operation 5, and send their respective identity tokens to the identity server as well as any other identity tokens of trusted partners that are stored in a local or cloud data pod. The respective identity tokens are indicative of a unique 1:1 relationship or a 1:N relationship if three or more parties are involved. Additionally, in some examples, the biometrics captured by the biometric device may be palm biometrics, facial biometrics, fingerprint biometrics, or other suitable biometrics.

At operation 7, the identity server receives the identity tokens from the first user 408 and the second user 410 and performs a probabilistic identity token verification for both the first user 408 and the second user 410 using some or all of the tokens received from the first user 408 and the second user 410. A trusted engagement is confirmed when one or more of the identity tokens from the first user 408 has a 1:1 match with one or more of the identity tokens from the second user 410.

Figure 5:
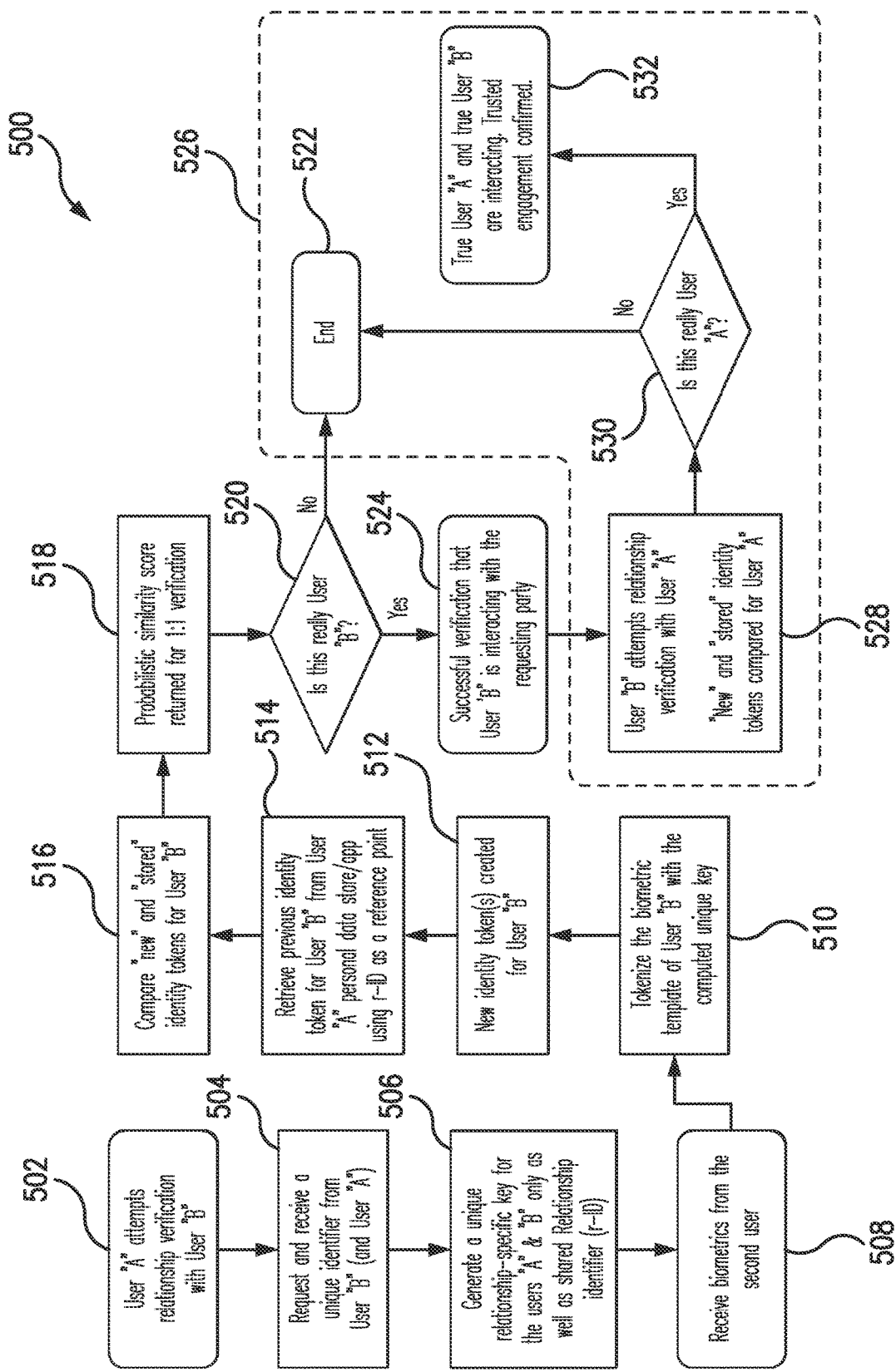
FIG. 5 is a block diagram illustrating a process that is an extension of the example of FIG. 4, in accordance with various aspects of the present disclosure.

FIG. 5 is a block diagram illustrating a process 500 that is an extension of the example 400 of FIG. 4, in accordance with various aspects of the present disclosure. In the example of FIG. 5, the process 500 is described in a sequential flow, however, some of the process 500 may also be performed in a parallel manner.

The process 500 starts when a first user (e.g., the first user 408) attempts to verify a relationship with a second user (e.g., the second user 410) with an identity server (e.g., the identity server 104) (at block 502). The process 500 includes the identity server requesting and receiving a unique identifier (e.g., decentralized identifier or "DID") from the first user and the second user (at block 504).

After receiving the unique identifier from both the first user and the second user, the process 500 includes the identity server generating a unique relationship-specific key for the first user and the second user as well as a shared relationship identifier (r-ID) (at block 506). The process 500 includes the identity server receiving biometrics from the second user (at block 508).

The process 500 includes the identity server tokenizing a biometric template of the second user with the unique relationship-specific key (at block 510). The process 500 includes creating new identity tokens for the second user from the tokenization of the biometric template of the second user (at block 512).

The process 500 includes the identity server retrieves a previous identity token for the second user from the personal data store of the first user using the r-ID as a reference point (at block 514). The process 500 includes the identity server comparing "new" and "stored" identity tokens for the second user (at block 516). The process 500 includes the identity server performing a probabilistic similarity score for a 1:1 verification from the comparison of the "new" and "stored" identity tokens for the second user (at block 518).

The process 500 includes the identity server determining whether the second user is actually the second user from a previous interaction based on the probabilistic similarity score (at decision block 520). When the identity server determines that the second user is not actually the second user from the previous interaction ("NO" at decision block 520), the identity server ends the process 500 (at block 522). When the identity server determines that the second user is actually the second user from the previous interaction ("YES" at decision block 520), the identity server determines that there is a successful verification that the second user is interacting with the requesting party, i.e., the first user (at block 524).

Additionally, after successful verification of the second user, the process 500 may also include the second user verifying the identity of the first user (at section 526). For example, the process 500 may include the identity server performing the operations described at blocks 508-518 with respect to the first user instead of the second user (at block 528).

The process 500 also includes the identity server determining whether the first user is actually the first user from a previous interaction based on the probabilistic similarity score (at decision block 530). When the identity server determines that the first user is not actually the first user from the previous interaction ("NO" at decision block 530), the identity server ends the process 500 (at block 522). When the identity server determines that the first user is actually the first user from the previous interaction ("YES" at decision block 530), the identity server determines that there is a successful verification that the first user has previously interacted with the requesting party, i.e., the second user (at block 532).

Figure 6:
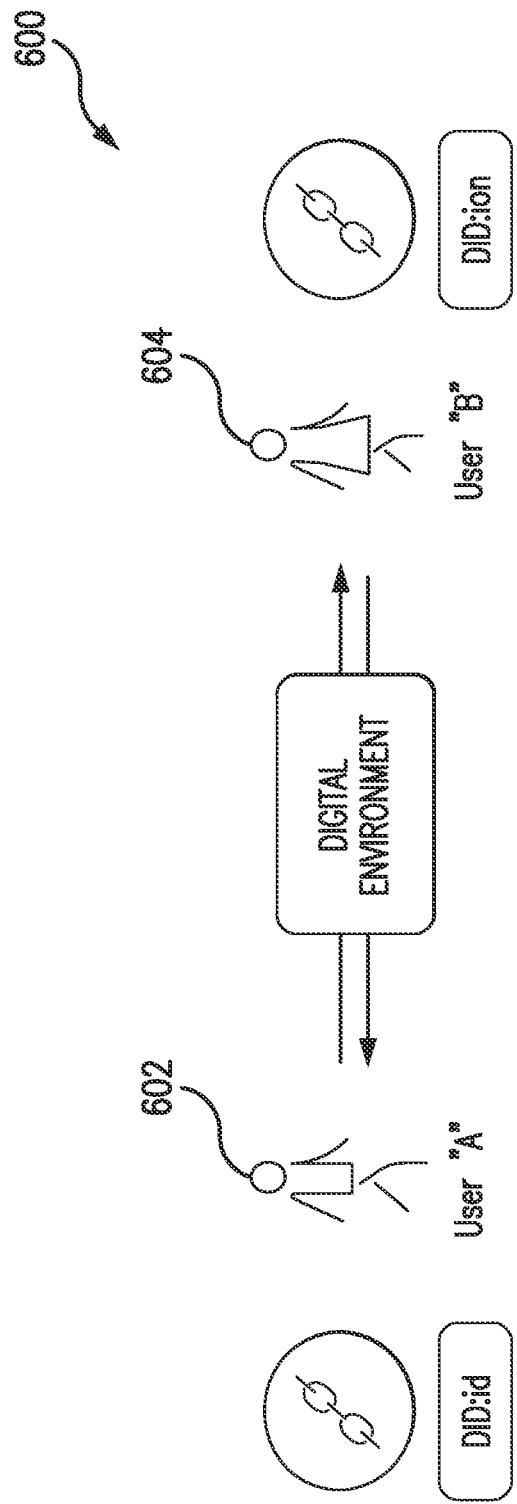
FIG. 6 is a diagram illustrating a second example of an identity challenge.

FIG. 6 is a diagram illustrating a second example of an identity challenge 600. Unlike the identity challenge 200 of FIG. 2, the identity challenge 600 has different unique identifiers. As illustrated in FIG. 6, the first user 602 has a first decentralized identifier (DID:id) and the second user 604 has a second decentralized identifier (DID:ion) that is different from the first decentralized identifier.

Additionally, while the same questions may be asked by individuals in either of the identity challenge 200 or the identity challenge 600, the identity challenge 600 may occur in situations that are different from the situations of the identity challenge 200. In a first example, the identity challenge 600 may occur when an individual receives a friend request from an unknown individual (unknown based on available information). In a second example, the identity challenge 600 may occur when an individual wants to ban or avoid interactions with an undesired personal contact. In a third example, the identity challenge 600 may occur when an individual meets with an imposter during a person-to-person transaction. In a fourth example, the identity challenge 600 may occur when an individual meets a friend that has lost access to his/her digital persona and has created a new digital persona. Lastly, the identity challenge 600 is not limited to these five examples and other examples of the identity challenge 600 may also exist and are solved by the present disclosure.

Figure 7:
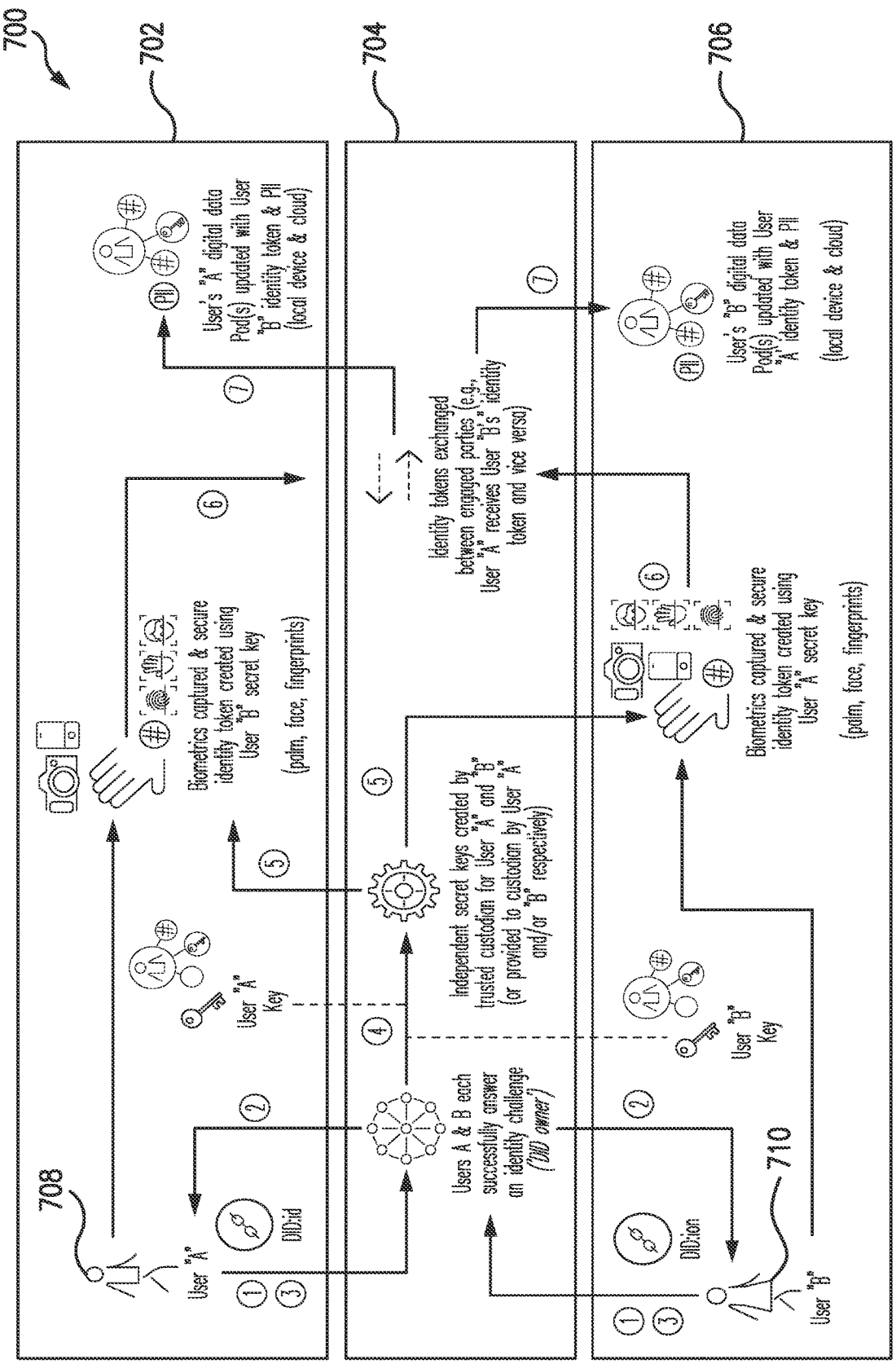
FIG. 7 is a flow diagram illustrating an example of establishing a trusted engagement with different identifier types, in accordance with various aspects of the present disclosure.

FIG. 7 is a flow diagram illustrating an example 700 of establishing a trusted engagement with different identifier types, in accordance with various aspects of the present disclosure. The example 700 includes three different sections, the first user section 702, the server section 704, and the second user section 706, where the server section 704 is performed by an identity server, for example, the identity server 104 of FIG. 1.

To establish the trusted engagement, at operation 1, a first user 708 in the first user section 702 and a second user 710 (in parallel or subsequently) challenge each other via an identity server (e.g., the identity server 104) in the server section 704 with their respective decentralized identifiers (e.g., DID:id for the first user 708 and DID:ion for the second user 710). At operation 2, the identity server responds with an identity challenge to the first user 708 and the second user 710. At operation 3, the first user 708 and the second user 710 respond to the identity challenge with an answer to the identity server that proves ownership of their respective decentralized identifiers.

At operation 4, the identity server confirms the respective answers from the first user 708 and the second user 710 are successful answers and respective independent secret keys for the first user and the second user are created by or provided to a trusted custodian. At operation 5, the identity server sends a first key of the respective independent secret keys to a first biometric device (e.g., a first user device with a camera and operated by the first user 708) and sends a second key of the respective independent secret keys to a second biometric device (e.g., a second user device with a camera and operated by the second user 710).

At operation 6, the first biometric device and the second biometric device capture biometrics from the first user 708 and the second user 710, respectively, create respective identity tokens using the respective independent secret keys that were sent in operation 5, and send their respective identity tokens to the identity server. The respective identity tokens are indicative of a unique 1:1 relationship or a 1:N relationship if three or more parties are involved. Additionally, in some examples, the biometrics captured by the biometric device may be palm biometrics, facial biometrics, fingerprint biometrics, or other suitable biometrics.

At operation 7, the identity server exchanges the identity tokens between the first user 708 and the second user 710. For example, when the first biometric device and the second biometric device are the first user device 130 and the second user device 140, respectively, then the identity server sends the identity token of the first user 708 to the second user device 140 and the identity token of the second user 710 to the first user device 130.

In some examples, the identity server updates a first data pod associated with the first user 708 to store the first independent secret key, personally identifiable information of the first user 708, and the identity token of the second user 710. Additionally, in these examples, the identity server also updates a second data pod associated with the second user 710 to store the second independent secret key, personally identifiable information of the second user 710, and the identity token of the first user 708. The first data pod and the second data pod may be located on a local device (e.g., the first user device 130 and the second user device 140) or on a cloud device (e.g., on the identity server 104 or other suitable third-party cloud device).

Figure 8:
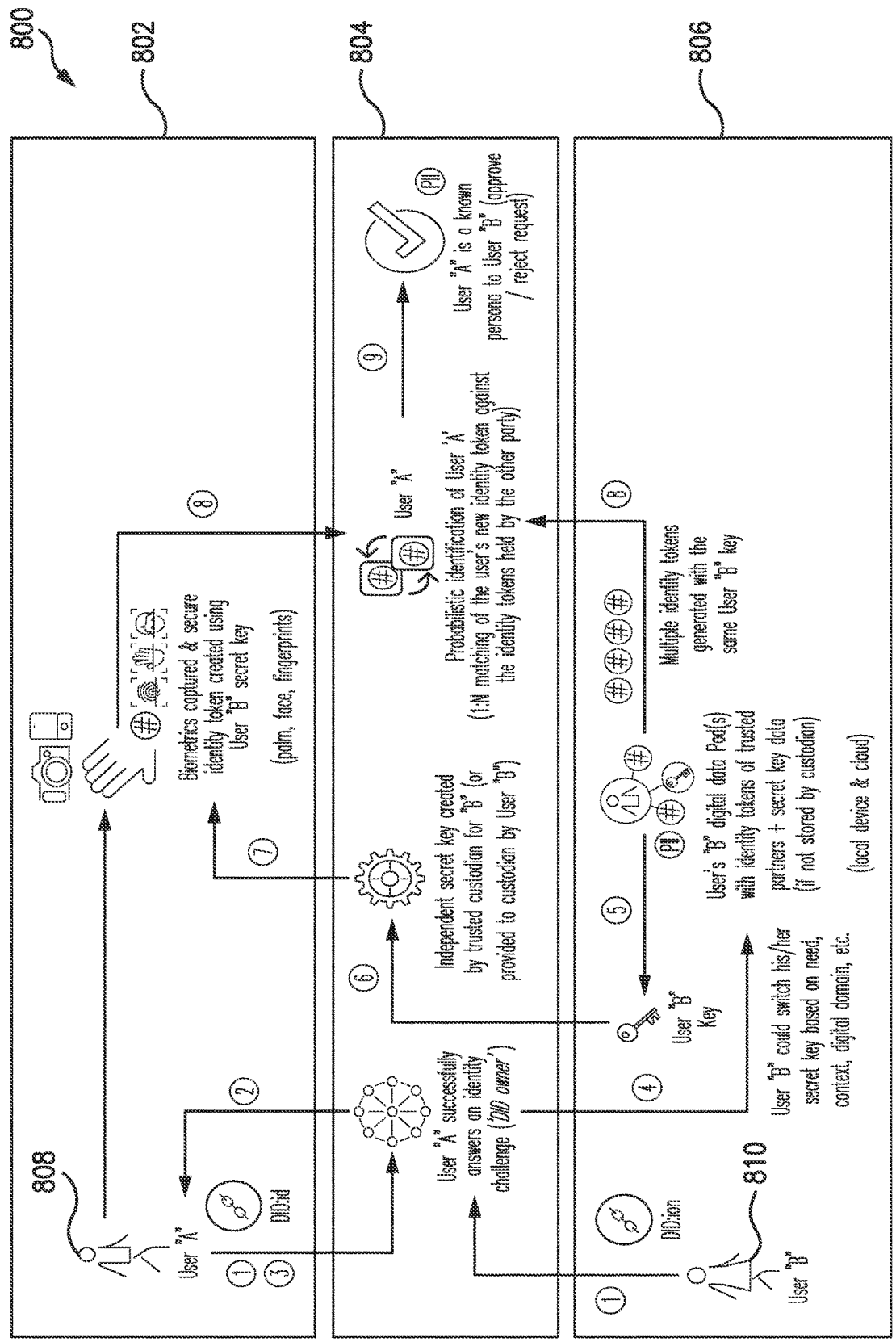
FIG. 8 is a flow diagram illustrating an example of confirming a trusted engagement with different identifier types, in accordance with various aspects of the present disclosure.

As illustrated in FIG. 7, the trusted engagement is first established by the exchange of identity tokens at operation 7. FIG. 8 is a flow diagram illustrating an example 800 of confirming a trusted engagement with different identifier types, in accordance with various aspects of the present disclosure. Like the example 700, the example 800 also includes three different sections, the first user section 802, the server section 804, and the second user section 806, where the server section 804 is performed by an identity server, for example, the identity server 104 of FIG. 1.

To confirm the trusted engagement, at operation 1, a first user 808 in the first user section 802 challenges the identity of the second user 810 with an identity server (e.g., the identity server 104) in the server section 804 with their respective decentralized identifiers (DID:id for the first user 808 and DID:ion for the second user 810). At operation 2, the identity server responds with an identity challenge to the first user 808. At operation 3, the first user 808 responds to the identity challenge with an answer to the identity server that proves ownership of the decentralized identifier of the first user 808.

At operation 4, the identity server requests a secret key from the personal data pod of the second user 810. The second user 810 may change the secret key based on need, context, digital domain, etc.

At operation 5, in some examples, the identity server receives the secret key from the second user 810 or other trusted custodian, where the other trusted custodian created the secret key. At operation 6, the identity server confirms the answer from the first user 808 is a successful answer and the independent secret key is received from the second user 810 or the trusted custodian. In other examples, the independent secret key is created by the identity server.

At operation 7, the identity server sends the independent secret key to a first biometric device (e.g., a first user device with a camera and operated by the first user 808). At operation 8, the first biometric device captures biometrics from the first user 808, creates an identity token using the independent secret key that was sent in operation 5, and sends the identity token to the identity server as well as any other identity tokens of trusted partners that are stored in a local device or cloud data pod. In some examples, the biometrics captured by the biometric device may be palm biometrics, facial biometrics, fingerprint biometrics, or other suitable biometrics.

Additionally, at operation 8, the second user 810 provides any identity tokens of trusted partners that are stored in a local device or cloud data pod. The respective identity tokens are indicative of a unique 1:1 relationship or a 1:N relationship if three or more parties are involved.

At operation 9, the identity server receives the identity tokens from the first user 808 and the second user 810 and performs a probabilistic identity token verification for both the first user 808 and the second user 810 using some or all of the tokens received from the first user 808 and the second user 810. A trusted engagement is confirmed when one or more of the identity tokens from the first user 808 has a 1:N match with the identity tokens from the second user 810.

Figure 9:
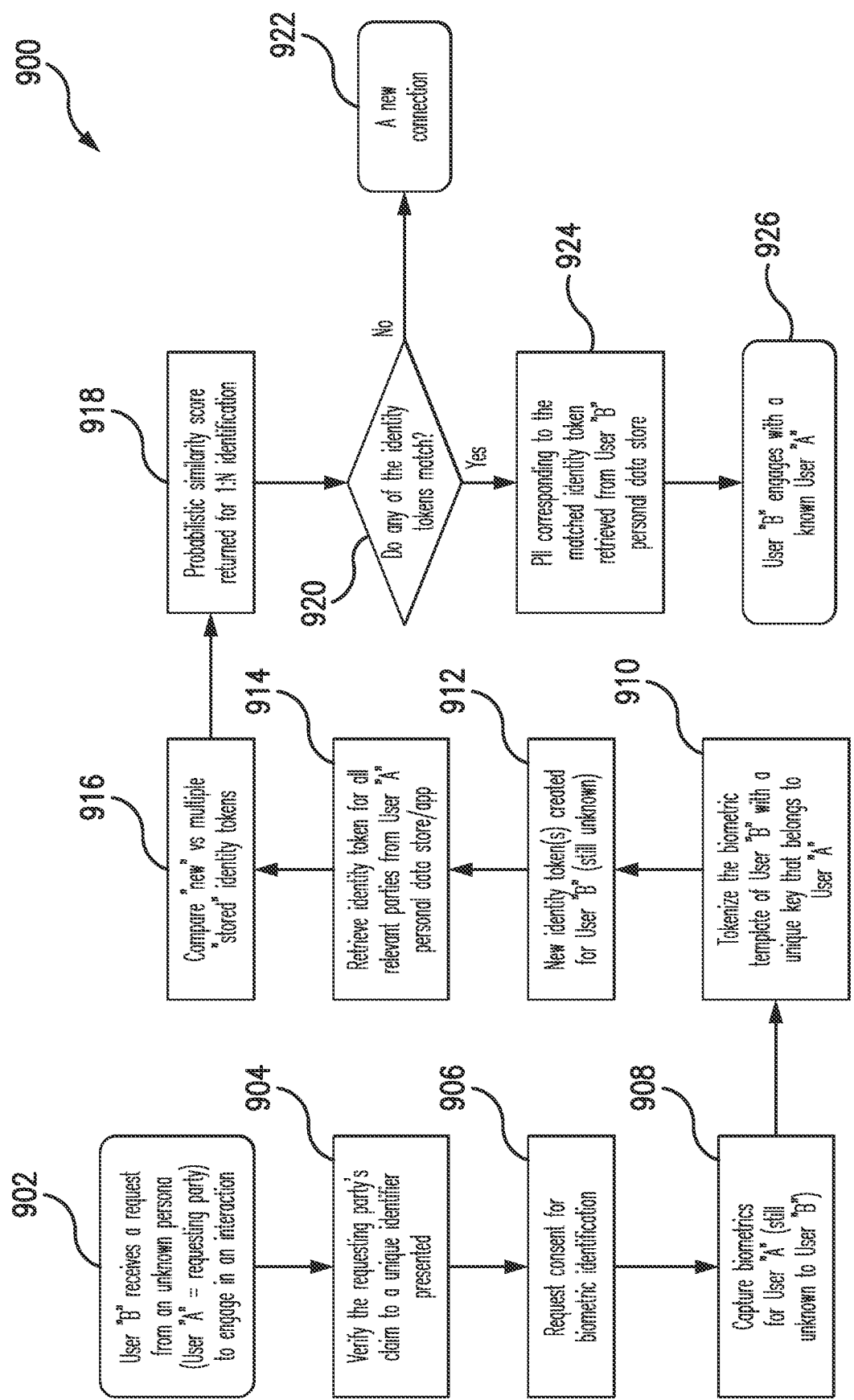
FIG. 9 is a block diagram illustrating a process that is an extension of the example of FIG. 8, in accordance with various aspects of the present disclosure.

FIG. 9 is a block diagram illustrating a process 900 that is an extension of the example 800 of FIG. 8, in accordance with various aspects of the present disclosure. In the example of FIG. 9, the process 900 is described in a sequential flow, however, some of the process 900 may also be performed in parallel.

The process 900 starts when a second user (e.g., the second user 810) receives a request from an unknown person (e.g., the first user 808) via an identity server (e.g., the identity server 104) (at block 902). The process 900 includes the identity server verifying the requesting party's claim to a unique identifier presented (at block 904).

After verifying the requesting party's claim to the unique identifier presented, the process 900 includes the identity server requesting consent from the first user for biometric identification (at block 906). For example, the individual associated with the first user device 130 consents to biometric capture by the first user device 130. The process 900 includes the identity server capturing biometrics for the unknown person (e.g., the first user 808) (at block 908).

The process 900 includes the identity server tokenizing a biometric template of the second user with a unique key that belongs to the unknown person (e.g., the first user 808) (at block 910). For example, the identity server 104 may create a biometric token from the biometric capture of the individual and the unique key with the biometric token creator. The biometric token creator creates a biometric token with a tokenization algorithm.

The process 900 includes the identity server creating new identity tokens for the second user from the tokenization of the biometric template of the second user (at block 912). For example, the identity server 104 may create an identity token from the biometric token with the identity token creator. The identity token creator creates an identity token with a second tokenization algorithm.

The process 900 includes the identity server retrieves previous identity tokens for all relevant parties from the personal data store of the first user (at block 914). The process 900 includes the identity server comparing a "new" identity token to multiple "stored" identity tokens for the unknown person (at block 916). The process 900 includes the identity server performing a probabilistic similarity score for a 1:N verification from the comparison of the "new" identity token to the multiple "stored" identity tokens for the unknown person (at block 918).

The process 900 includes the identity server determining whether any of the identity tokens match based on the probabilistic similarity score for the 1:N verification (at decision block 920). When the identity server determines that none of the identity tokens match based on the probabilistic similarity score for the 1:N verification ("NO" at decision block 920), the identity server determines the request by the unknown person is a new request (at block 922). When the identity server determines that one or more of the identity tokens match based on the probabilistic similarity score for the 1:N verification ("YES" at decision block 920), the identity server retrieves the personally identifiable information ("PII") corresponding to the matched identity token from the personal data store of the second user (e.g., the second user 810) (at block 924).

Lastly, the identity server connects the second user (e.g., the second user 810) to the known user (e.g., the first user 808) based on the retrieval of the PII associated with the known user (at block 926). In some examples, the identity server may also output some or all of the PII associated with the known user to the second user (e.g., the second user 810) confirming the trusted engagement.

Figure 10A:
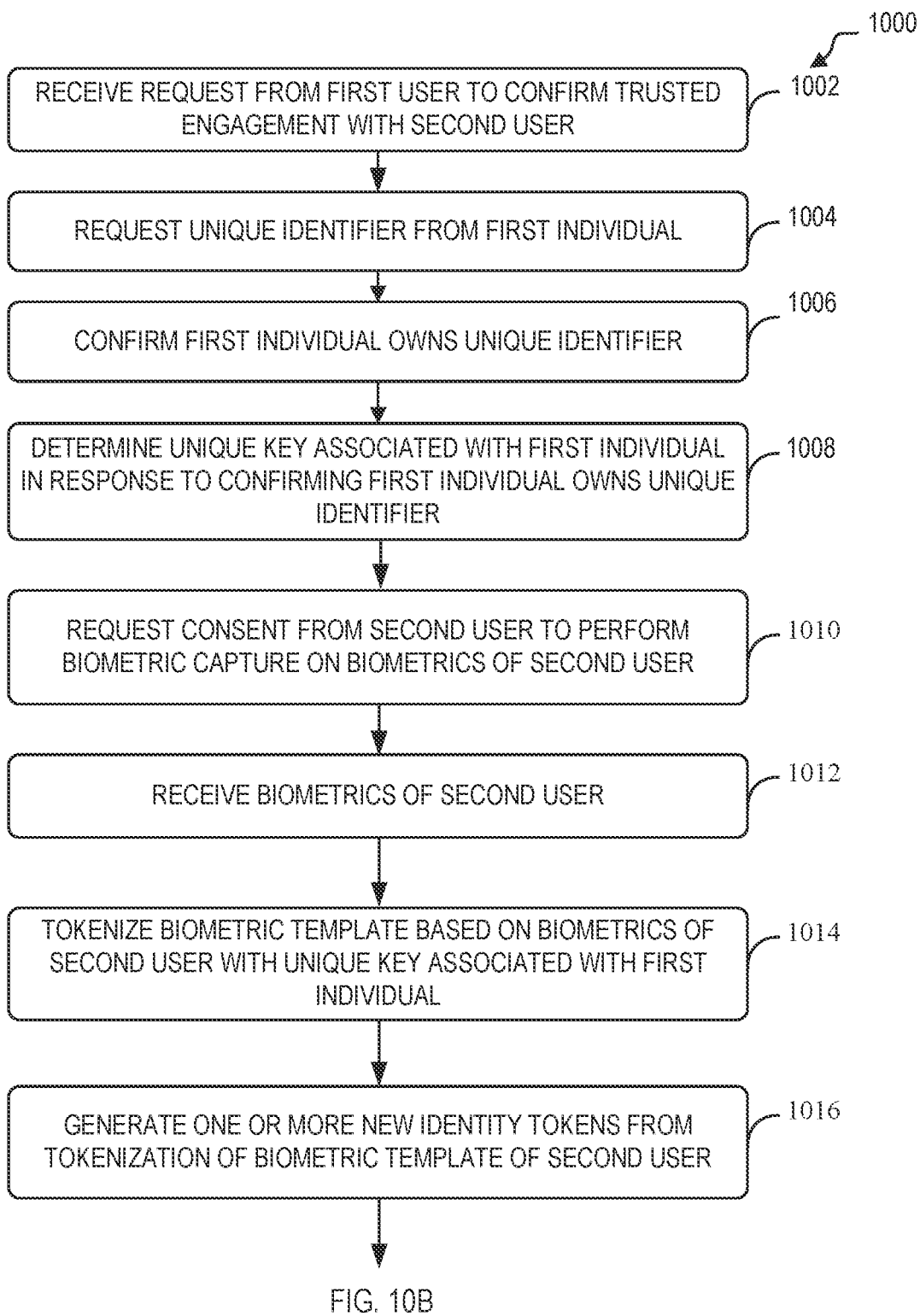

FIGS. 10A and 10B are flow diagrams illustrating an example process 1000 for biometrically confirming a trusted engagement between two or more individuals, in accordance with various aspects of the present disclosure. FIGS. 10A and 10B are described with respect to FIG. 1.

In the example of FIG. 10A, the example process 1000 includes receiving, with a server, a request from a first user to confirm a trusted engagement with a second user (at block 1002).

The example process 1000 includes requesting, with the server, a unique identifier from the first individual (at block 1004). For example, the identity server 104 requests a unique identifier from a first individual associated with the first user device 130.

The example process 1000 includes confirming, with the server, the first individual owns the unique identifier (at block 1006). For example, the identity server 104 confirms the first individual owns the unique identifier based on an answer from the first individual via the first user device 130.

The example process 1000 includes determining, with the server, a unique key associated with the first individual in response to confirming the first individual owns the unique identifier (at block 1008). For example, the identity server 104 determines a unique key associated with the first individual in response to confirming the first individual owns the unique identifier.

The example process 1000 includes requesting, with the server, consent from the second user to perform a biometric capture on biometrics of the second user (at block 1010). For example, the identity server 104 requests consent from a second user via the second user device 140 to perform a biometric capture on biometrics of the second user.

The example process 1000 includes receiving, with the server, the biometrics of the second user (at block 1012). For example, the identity server 104 receives the biometrics of the second user via the second user device 140.

The example process 1000 includes tokenizing, with the server, a biometric template based on the biometrics of the second user with the unique key associated with the first individual (at block 1014). For example, the identity server 104 tokenizes a biometric template based on the biometrics of the second user with the unique key associated with the first individual.

The example process 1000 includes generating, with the server, one or more new identity tokens from the tokenization of the biometric template of the second user (at block 1016). For example, the identity server 104 generates one or more new identity tokens from the tokenization of the biometric template of the second user.

Referring now to FIG. 10B, the example process 1000 includes retrieving, with the server, one or more stored identity tokens from a personal data store of the first individual (at block 1018). For example, the identity server 104 retrieves one or more stored identity tokens from the record 116 of the first individual.

The example process 1000 includes comparing, with the server, the one or more new identity tokens to the one or more stored identity tokens (at block 1020). For example, the identity server 104 compares the one or more new identity tokens to the one or more stored identity tokens.

The example process 1000 includes performing, with the server, a probabilistic score based on the comparison of the one or more new identity tokens to the one or more stored identity tokens (at block 1022). For example, the identity server 104 performs a probabilistic score based on the comparison of the one or more new identity tokens to the one or more stored identity tokens.

The example process 1000 includes determining, with the server, whether any of the one or more new identity tokens match the one or more stored identity tokens based on the probabilistic score (at block 1024). For example, the identity server 104 determines whether any of the one or more new identity tokens match the one or more stored identity tokens based on the probabilistic score.

The example process 1000 also includes confirming, with the server, the trusted engagement with the first individual and the second user in response to determining that the any of the one or more new identity tokens match the one or more stored identity tokens based on the probabilistic score (at block 1026). For example, the identity server 104 confirms the trusted engagement with the first individual and the second user in response to determining that the any of the one or more new identity tokens match the one or more stored identity tokens based on the probabilistic score.

Additionally, in some examples, the example process 1000 may further include confirming, with the server, no trusted engagement with the first individual and the second user in response to determining that none of the one or more new identity tokens match the one or more stored identity tokens based on the probabilistic score (at block 1028).

In some examples, the example process 1000 may further include requesting a second unique identifier from the second user, the second unique identifier and the unique identifier being the same type; and confirming the second user owns the second unique identifier. In these examples, determining the unique key associated with the first individual in response to confirming the first individual owns the unique identifier further includes determining a relationship-specific unique key based on the unique identifier and the second unique identifier in response to confirming the first individual owns the unique identifier and confirming the second user owns the second unique identifier, and tokenizing the biometric template of the second user with the unique key associated with the first individual further includes tokenizing the biometric template of the second user with the relationship-specific unique key.

In some examples, the example process 1000 may further include sending the relationship-specific unique key to the personal data store of the first individual, and sending the relationship-specific unique key to a second personal data store of the second user. In these examples, the personal data store may be located in one of a first local memory or a first cloud storage, and the second personal data store may be located in one of a second local memory or a second cloud storage.

In some examples, retrieving the one or more stored identity tokens from the personal data store of the first individual may further includes retrieving one stored identity token from the personal data store of the first individual using the relationship-specific unique key as a reference point, and performing the probabilistic score based on the comparison of the one or more new identity tokens to the one or more stored identity tokens may further include performing the probabilistic score based on a comparison of one new identity token to the one stored identity token that is retrieved.

In some examples, the example process 1000 may further include requesting a second unique identifier from the second user, the second unique identifier being a different type from the unique identifier; and confirming the second user owns the second unique identifier. In these examples, determining the unique key associated with the first individual in response to confirming the first individual owns the unique identifier further includes determining an independent secret key associated with the first individual in response to confirming the first individual owns the unique identifier and confirming the second user owns the second unique identifier, and tokenizing the biometric template of the second user with the unique key associated with the first individual further includes tokenizing the biometric template of the second user with the independent secret key.

In some examples, retrieving the one or more stored identity tokens from the personal data store of the first individual may further include retrieving a plurality of identity tokens from the personal data store of the first individual, and performing the probabilistic score based on the comparison of the one or more new identity tokens to the one or more stored identity tokens may further include performing the probabilistic score based on the comparison of the one or more new identity tokens to the plurality of identity tokens that are retrieved.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A system for biometrically confirming a trusted engagement between two or more individuals, the system comprising:
    a first user device including a first electronic processor and a first memory, the first user device associated with a first individual;
    a second user device including a second electronic processor and a second memory, the second user device associated with a second individual that is separate and distinct from the first individual; and
    a server including a third electronic processor and a third memory, the third electronic processor configured to:
        receive a request from the first individual to confirm a trusted engagement with the second individual,
        request a unique identifier from the first individual,
        confirm the first individual owns the unique identifier,
        determine a unique key associated with the first individual in response to confirming the first individual owns the unique identifier,
        request consent from the second individual to perform a biometric capture on biometrics of the second individual,
        receive the biometrics of the second individual,
        perform, with the unique key associated with the first individual, a tokenization of a biometric template of the second individual, the biometric template based on the biometrics of the second individual,
        generate one or more new identity tokens from the tokenization of the biometric template of the second user,
        retrieve one or more stored identity tokens from a personal data store of the first individual,
        perform a comparison of the one or more new identity tokens to the one or more stored identity tokens,
        perform a probabilistic score based on the comparison of the one or more new identity tokens to the one or more stored identity tokens,
        determine whether any of the one or more new identity tokens match the one or more stored identity tokens based on the probabilistic score, and
        confirm the trusted engagement with the first individual and the second individual in response to determining that the any of the one or more new identity tokens match the one or more stored identity tokens based on the probabilistic score.

2. The system of claim 1, wherein the third electronic processor is further configured to:
    request a second unique identifier from the second individual, the second unique identifier and the unique identifier being the same type,
    confirm the second individual owns the second unique identifier,
    wherein, to determine the unique key associated with the first individual in response to confirming the first individual owns the unique identifier, the third electronic processor is further configured to determine a relationship-specific unique key based on the unique identifier and the second unique identifier in response to confirming the first individual owns the unique identifier and confirming the second individual owns the second unique identifier, and
    wherein, to tokenize the biometric template, the third electronic processor is further configured to tokenize the biometric template with the relationship-specific unique key.

3. The system of claim 2, wherein the third electronic processor is further configured to:
    send the relationship-specific unique key to the personal data store of the first individual, and
    send the relationship-specific unique key to a second personal data store of the second individual.

4. The system of claim 3, wherein the personal data store is located in one of the first memory or a first cloud storage, and wherein the second personal data store is located in one of the second memory or a second cloud storage.

5. The system of claim 2, wherein, to retrieve the one or more stored identity tokens from the personal data store of the first individual, the third electronic processor is further configured to retrieve one stored identity token from the personal data store of the first individual using the relationship-specific unique key as a reference point, and
    wherein, to perform the probabilistic score based on the comparison of the one or more new identity tokens to the one or more stored identity tokens, the third electronic processor is further configured to perform the probabilistic score based on a comparison of one new identity token to the one stored identity token that is retrieved.

6. The system of claim 1, wherein the third electronic processor is further configured to:
    request a second unique identifier from the second individual, the second unique identifier being a different type from the unique identifier,
    confirm the second individual owns the second unique identifier,
    wherein, to determine the unique key associated with the first individual in response to confirming the first individual owns the unique identifier, the third electronic processor is further configured to determine an independent secret key associated with the first individual in response to confirming the first individual owns the unique identifier and confirming the second individual owns the second unique identifier, and
    wherein, to tokenize the biometric template, the third electronic processor is further configured to tokenize the biometric template with the independent secret key.

7. The system of claim 6, wherein, to retrieve the one or more stored identity tokens from the personal data store of the first individual, the third electronic processor is further configured to retrieve a plurality of identity tokens from the personal data store of the first individual, and
    wherein, to perform the probabilistic score based on the comparison of the one or more new identity tokens to the one or more stored identity tokens, the third electronic processor is further configured to perform the probabilistic score based on the comparison of the one or more new identity tokens to the plurality of identity tokens that are retrieved.

8. A method for biometrically confirming a trusted engagement between two or more individuals, the method comprising:

receiving, by a server, a request from a first user device to confirm a trusted engagement between a first individual and a second individual, wherein the first user device is associated with the first individual, and wherein the second individual is separate and distinct from the first individual;

requesting, by the server, a unique identifier from the first individual;

confirming, by the server, the first individual owns the unique identifier;

determining, by the server, a unique key associated with the first individual in response to confirming the first individual owns the unique identifier;

requesting, by the server, consent from the second individual to perform a biometric capture on biometrics of the second individual;

receiving, by the server, the biometrics of the second individual;

performing, by the server with the unique key associated with the first individual, a tokenization of a biometric template of the second individual, the biometric template based on the biometrics of the second individual;

generating, by the server, one or more new identity tokens from the tokenization of the biometric template;

retrieving, by the server, one or more stored identity tokens from a personal data store of the first individual;

performing, by the server, a comparison of the one or more new identity tokens to the one or more stored identity tokens;

performing, by the server, a probabilistic score based on the comparison of the one or more new identity tokens to the one or more stored identity tokens;

determining, by the server, whether any of the one or more new identity tokens match the one or more stored identity tokens based on the probabilistic score; and confirming, by the server, the trusted engagement with the first individual and the second individual in response to determining that the any of the one or more new identity tokens match the one or more stored identity tokens based on the probabilistic score.

9. The method of claim 8, further comprising:

requesting a second unique identifier from the second individual, the second unique identifier and the unique identifier being the same type; and confirming the second individual owns the second unique identifier, wherein determining the unique key associated with the first individual in response to confirming the first individual owns the unique identifier further includes determining a relationship-specific unique key based on the unique identifier and the second unique identifier in response to confirming the first individual owns the unique identifier and confirming the second individual owns the second unique identifier, and wherein tokenizing the biometric template of the second individual with the unique key associated with the first individual further includes tokenizing the biometric template of the second individual with the relationship-specific unique key.

10. The method of claim 9, further comprising:

sending the relationship-specific unique key to the personal data store of the first individual, and sending the relationship-specific unique key to a second personal data store of the second individual.

11. The method of claim 10, wherein the personal data store is located in one of a first local memory or a first cloud storage, and wherein the second personal data store is located in one of a second local memory or a second cloud storage.

12. The method of claim 9, wherein retrieving the one or more stored identity tokens from the personal data store of the first individual further includes retrieving one stored identity token from the personal data store of the first individual using the relationship-specific unique key as a reference point, and wherein performing the probabilistic score based on the comparison of the one or more new identity tokens to the one or more stored identity tokens further includes performing the probabilistic score based on a comparison of one new identity token to the one stored identity token that is retrieved.

13. The method of claim 8, further comprising:

requesting a second unique identifier from the second individual, the second unique identifier being a different type from the unique identifier; and confirming the second individual owns the second unique identifier, wherein determining the unique key associated with the first individual in response to confirming the first individual owns the unique identifier further includes determining an independent secret key associated with the first individual in response to confirming the first individual owns the unique identifier and confirming the second individual owns the second unique identifier, and wherein tokenizing the biometric template of the second individual with the unique key associated with the first individual further includes tokenizing the biometric template of the second individual with the independent secret key.

14. The method of claim 13, wherein retrieving the one or more stored identity tokens from the personal data store of the first individual further includes retrieving a plurality of identity tokens from the personal data store of the first individual, and wherein performing the probabilistic score based on the comparison of the one or more new identity tokens to the one or more stored identity tokens further includes performing the probabilistic score based on the comparison of the one or more new identity tokens to the plurality of identity tokens that are retrieved.

15. A non-transitory computer-readable medium comprising instructions that, when executed by an electronic processor, cause the electronic processor to perform a set of operations comprising:

receiving a request from a first user device to confirm a trusted engagement between a first individual and a second individual, wherein the first user device is associated with the first individual, and wherein the second individual is separate and distinct from the first individual;

requesting a unique identifier from the first individual;

confirming the first individual owns the unique identifier;

determining a unique key associated with the first individual in response to confirming the first individual owns the unique identifier;

requesting consent from the second individual to perform a biometric capture on biometrics of the second individual;

receiving biometrics of the second individual;

performing, with the unique key associated with the first individual, a tokenization of a biometric template of the second individual, the biometric template based on the biometrics of the second individual;

generating one or more new identity tokens from the tokenization of the biometric template;

retrieving one or more stored identity tokens from a personal data store of the first individual;

performing a comparison of the one or more new identity tokens to the one or more stored identity tokens;

performing a probabilistic score based on the comparison of the one or more new identity tokens to the one or more stored identity tokens;

determining whether any of the one or more new identity tokens match the one or more stored identity tokens based on the probabilistic score; and confirming the trusted engagement with the first individual and the second individual in response to determining that the any of the one or more new identity tokens match the one or more stored identity tokens based on the probabilistic score, wherein the second individual is separate and distinct from the first individual.

16. The non-transitory computer-readable medium of claim 15, further comprising:

requesting a second unique identifier from the second individual, the second unique identifier and the unique identifier being the same type; and confirming the second individual owns the second unique identifier, wherein determining the unique key associated with the first individual in response to confirming the first individual owns the unique identifier further includes determining a relationship-specific unique key based on the unique identifier and the second unique identifier in response to confirming the first individual owns the unique identifier and confirming the second individual owns the second unique identifier, and wherein tokenizing the biometric template of the second individual with the unique key associated with the first individual further includes tokenizing the biometric template of the second individual with the relationship-specific unique key.

17. The non-transitory computer-readable medium of claim 16, further comprising:

sending the relationship-specific unique key to the personal data store of the first individual, and sending the relationship-specific unique key to a second personal data store of the second individual.

18. The non-transitory computer-readable medium of claim 16, wherein retrieving the one or more stored identity tokens from the personal data store of the first individual further includes retrieving one stored identity token from the personal data store of the first individual using the relationship-specific unique key as a reference point, and wherein performing the probabilistic score based on the comparison of the one or more new identity tokens to the one or more stored identity tokens further includes performing the probabilistic score based on a comparison of one new identity token to the one stored identity token that is retrieved.

19. The non-transitory computer-readable medium of claim 15, further comprising:

requesting a second unique identifier from the second individual, the second unique identifier being a different type from the unique identifier; and confirming the second individual owns the second unique identifier, wherein determining the unique key associated with the first individual in response to confirming the first individual owns the unique identifier further includes determining an independent secret key associated with the first individual in response to confirming the first individual owns the unique identifier and confirming the second individual owns the second unique identifier, and wherein tokenizing the biometric template of the second individual with the unique key associated with the first individual further includes tokenizing the biometric template of the second individual with the independent secret key.

20. The non-transitory computer-readable medium of claim 19, wherein retrieving the one or more stored identity tokens from the personal data store of the first individual further includes retrieving a plurality of identity tokens from the personal data store of the first individual, and wherein performing the probabilistic score based on the comparison of the one or more new identity tokens to the one or more stored identity tokens further includes performing the probabilistic score based on the comparison of the one or more new identity tokens to the plurality of identity tokens that are retrieved.

* * * * *